US006757791B1

(12) United States Patent
O'Grady et al.

(10) Patent No.: US 6,757,791 B1
(45) Date of Patent: Jun. 29, 2004

(54) METHOD AND APPARATUS FOR REORDERING PACKET DATA UNITS IN STORAGE QUEUES FOR READING AND WRITING MEMORY

(75) Inventors: Robert O'Grady, Palo Alto, CA (US); Sonny N. Tran, San Jose, CA (US); Yie-Fong Dan, Cupertino, CA (US); Bruce Wilford, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/282,080

(22) Filed: Mar. 30, 1999

(51) Int. Cl.[7] .......................... G06F 13/00; H04L 12/56
(52) U.S. Cl. ........................ 711/154; 711/167; 711/5; 370/412; 370/413; 710/54
(58) Field of Search ......................... 711/5, 157, 158, 711/153, 154, 167; 710/39, 54, 52; 370/386, 412, 413, 414, 419

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |

(List continued on next page.)

FOREIGN PATENT DOCUMENTS

| | | |
|---|---|---|
| EP | 0 384 758 | 8/1990 |
| EP | 0 431 751 | 6/1991 |
| WO | WO 93/07569 | 4/1993 |
| WO | WO 93/07692 | 4/1993 |
| WO | 0 567 217 | 10/1993 |
| WO | WO 94/01828 | 1/1994 |
| WO | WO 95/20850 | 8/1995 |

OTHER PUBLICATIONS

William Stallings, Data and Computer Communications, pp.: 329–333, Prentice Hall, Upper Saddle River, New Jersey 07458.

Allen, M., "Novell IPX Over Various WAN Media (IPX AN)," Network Working Group, RFC 1551, Dec. 1993, pp. 1–22.

(List continued on next page.)

Primary Examiner—Glenn Gossage
(74) Attorney, Agent, or Firm—Hickman Palermo Truong & Becker LLP

(57) ABSTRACT

A method and system for reordering data units that are to be written to, or read from, selected locations in a memory are described herein. The data units are reordered so that an order of accessing memory is optimal for speed of reading or writing memory, not necessarily an order in which data units were received or requested. Packets that are received at input interfaces are divided into cells, with cells being allocated to independent memory banks. Many such memory banks are kept busy concurrently, so cells (and thus the packets) are read into the memory as rapidly as possible. The system may include an input queue for receiving data units in a first sequence and a set of storage queues coupled to the input queue for receiving data units from the input queue. The data units may be written from the storage queues to the memory in an order other than the first sequence. The system may also include a disassembly element for generating data units from a packet and a reassembling element for reassembling a packet from the data units.

26 Claims, 4 Drawing Sheets

U.S. PATENT DOCUMENTS

| | | |
|---|---|---|
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir ................... 701/117 |
| 4,980,897 A | 12/1990 | Decker et al. |
| 4,991,169 A | 2/1991 | Davis et al. |
| 5,003,595 A | 3/1991 | Collins et al. |
| 5,006,982 A * | 4/1991 | Ebersole et al. ............ 710/263 |
| 5,014,265 A | 5/1991 | Hahne et al. |
| 5,020,058 A | 5/1991 | Holden et al. |
| 5,033,076 A | 7/1991 | Jones et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. ........... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,339,311 A | 8/1994 | Turner |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,483,523 A | 1/1996 | Nederlof |
| 5,485,455 A | 1/1996 | Dobbins et al. |
| 5,490,140 A | 2/1996 | Abensour et al. |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweazey |
| 5,509,006 A | 4/1996 | Wilford et al. |
| 5,517,494 A | 5/1996 | Green |
| 5,519,700 A * | 5/1996 | Punj .......................... 370/419 |
| 5,519,704 A | 5/1996 | Farinacci et al. |
| 5,519,858 A | 5/1996 | Walton et al. ................ 707/10 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |

| | | | |
|---|---|---|---|
| 5,600,798 A | | 2/1997 | Cherukuri et al. |
| 5,604,868 A | | 2/1997 | Komine et al. |
| 5,608,726 A | | 3/1997 | Virgile |
| 5,617,417 A | | 4/1997 | Sathe et al. |
| 5,617,421 A | | 4/1997 | Chin et al. |
| 5,629,927 A | * | 5/1997 | Waclawsky et al. ........ 370/253 |
| 5,630,125 A | | 5/1997 | Zellweger |
| 5,631,908 A | | 5/1997 | Saxe .......................... 370/235 |
| 5,632,021 A | | 5/1997 | Jennings et al. |
| 5,633,865 A | | 5/1997 | Short |
| 5,634,010 A | | 5/1997 | Ciscon et al. |
| 5,638,359 A | | 6/1997 | Peltola et al. |
| 5,640,399 A | | 6/1997 | Rostoker et al. |
| 5,644,718 A | | 7/1997 | Belove et al. |
| 5,659,684 A | | 8/1997 | Giovannoni et al. |
| 5,666,353 A | | 9/1997 | Klausmeier et al. |
| 5,673,265 A | | 9/1997 | Gupta et al. |
| 5,678,006 A | | 10/1997 | Valizadeh et al. |
| 5,680,116 A | | 10/1997 | Hashimoto et al. |
| 5,684,797 A | | 11/1997 | Aznar et al. |
| 5,687,324 A | | 11/1997 | Green et al. ................. 370/414 |
| 5,689,506 A | | 11/1997 | Chiussi et al. |
| 5,694,390 A | | 12/1997 | Yamato et al. |
| 5,724,351 A | | 3/1998 | Chao et al. ............ 370/395.42 |
| 5,732,041 A | * | 3/1998 | Joffe ...................... 365/230.05 |
| 5,740,402 A | * | 4/1998 | Bratt et al. .................. 711/157 |
| 5,748,186 A | | 5/1998 | Raman |
| 5,748,617 A | | 5/1998 | McLain, Jr. |
| 5,754,547 A | | 5/1998 | Nakazawa .................. 370/401 |
| 5,802,054 A | | 9/1998 | Bellenger |
| 5,809,415 A | | 9/1998 | Rossmann |
| 5,822,772 A | * | 10/1998 | Chan et al. .................. 711/158 |
| 5,835,710 A | | 11/1998 | Nagami et al. |
| 5,854,903 A | | 12/1998 | Morrison et al. ........... 709/249 |
| 5,856,981 A | | 1/1999 | Voelker |
| 5,859,856 A | * | 1/1999 | Oskouy et al. ............. 370/395 |
| 5,862,136 A | * | 1/1999 | Irwin ......................... 370/395 |
| 5,870,382 A | | 2/1999 | Tounai et al. |
| 5,892,924 A | | 4/1999 | Lyon et al. ................. 709/245 |
| 5,898,686 A | | 4/1999 | Virgile ....................... 370/381 |
| 5,903,559 A | | 5/1999 | Acharya et al. |
| 5,905,725 A | * | 5/1999 | Sindhu et al. .............. 370/389 |
| 6,038,646 A | * | 3/2000 | Sproull ....................... 711/158 |
| 6,137,807 A | * | 10/2000 | Rusu et al. ................. 370/429 |
| 6,144,637 A | * | 11/2000 | Calvignac et al. .......... 370/229 |
| 6,259,699 B1 | * | 7/2001 | Opalka et al. .............. 370/398 |
| 6,272,567 B1 | * | 8/2001 | Pal et al. ...................... 710/56 |
| 6,487,202 B1 | * | 11/2002 | Klausmeier et al. ........ 370/395 |
| 6,493,347 B2 | * | 12/2002 | Sindhu et al. .............. 370/398 |

OTHER PUBLICATIONS

Becker, D., "3c589.c: A 3c589 EtherLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

* cited by examiner

METHOD AND APPARATUS FOR REORDERING PACKET DATA UNITS IN STORAGE QUEUES FOR READING AND WRITING MEMORY

BACKGROUND OF THE INVENTION

1. Field of the Invention

This invention relates to reordering data units for reading and writing memory, such as for example used in packet buffering in a packet router.

In a computer network, routing devices receive messages at one of a set of input interfaces, and forward them on to one of a set of output interfaces. It is advantageous for such routing devices to operate as quickly as possible so as to keep up with the rate of incoming messages. As they are received at an input interface, packets are read from the input interface into a memory, a decision is made by the router regarding to which output interface the packet is to be sent, and the packet is read from the memory to the output interface.

One problem in the known art is that packets are often of differing lengths, so that storing the packet in memory can use multiple cells of that memory. This complicates the decision of where in the memory to record the packet, and, depending on the nature of the memory, can slow the operations of reading packets into memory or reading packets from memory.

This problem in the known art is exacerbated by the relative speed with which memory can read and write. As memory becomes ever faster, the desirability of using the relative speed of that memory becomes ever greater. This problem is particularly acute when the memory itself has a plurality of memory banks capable of operating concurrently. Moreover, this problem is exacerbated when memory transfers use a relatively wide data transfer width; transfers that require just one or a few bytes more than the maximum transfer width waste relatively more memory read and write bandwidth as the data transfer width becomes relatively larger.

Accordingly, it would be advantageous to provide a packet buffer memory that uses as much of the speed of the memory as possible, particularly when that memory has banks which are capable of operating concurrently. This advantage is achieved in an embodiment of the invention in which packets are divided into cells, cells are allocated to memory banks capable of operating concurrently, and packets are reconstructed from the cells that were recorded in memory. Writing cells into the memory and reading cells from the memory need not occur in the same order in which those cells are received.

SUMMARY OF THE INVENTION

The invention is directed to a method and system for reordering data units that are to be written to, or read from, selected locations in a memory. The data units are re-ordered so that an order of accessing memory (or portions thereof) is optimal for speed of reading or writing memory, not necessarily an order in which data units were received or requested.

The invention is applicable to a packet memory, and a method for operating that packet memory, so as to use as much memory speed as possible. Packets that are received at input interfaces are divided into cells, with the cells being allocated to independent memory banks. Many such memory banks are kept busy concurrently, so the cells (and thus the packets) are read into the memory as rapidly as possible. A set of first-in-first-out (FIFO) queues includes one queue for each such memory bank, and is disposed in a sequence of rows (herein called "stripes") so as to have one queue element for each time slot to write to the memory. The FIFO queues can include cells in each stripe from more than one complete packet, so as to reduce the number of memory operations for multiple packets.

In a preferred embodiment, as packets are received, their packet information is disassembled into cells of a uniform size. The individual cells are mapped to sequential memory addresses, in response to the order in which they appear in packets, and in response to the packet queue(s) the packet is to be written to. When the memory is ready to read cells into the memory, a stripe of cells from those queues is read into the memory.

Similarly, for packets that are to be sent to output interfaces, cells can be located in the independent memory banks and read therefrom, so the cells (and thus the packets) are read out of the memory as rapidly as possible. Cells from the memory can be placed in individual queues for each memory bank. When the memory is ready to read cells out of the memory, one stripe of cells from those queues can be read out of the memory, and packets can be reassembled from those cells.

In a preferred embodiment, each stripe of cells to be read into or read out of the memory is filled, as much as possible, before the next memory cycle, so as to make most efficient use of the parallel capacity of the memory. Similarly, stripes of cells to be read into or read out of the memory are also filled, as much as possible, in advance, so that memory cycles can be performed rapidly without waiting for filling any individual memory bank queue. Either of these might involve advancing cells of one or more packets out of order from the rest of their packet, so as to maintain one or more memory banks busy.

DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using processors or circuits adapted to particular process steps and data structures described herein, and that implementation of the process steps and data structures described herein would not require undue experimentation or further invention.

System Elements

Figure 1:
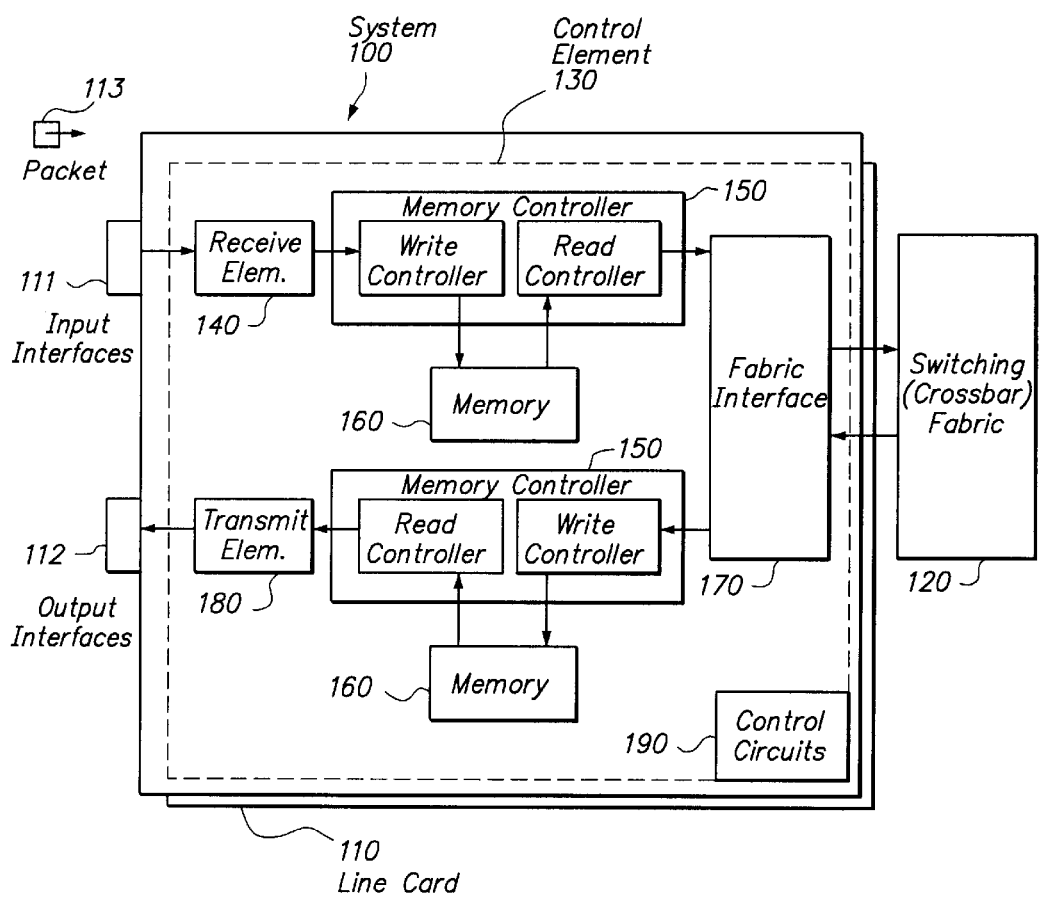
FIG. 1 shows a block diagram of an improved system for packet buffer memory use.

FIG. 1 shows a block diagram of an improved system for packet buffer memory use.

A system 100 includes a set of line cards 110 and a switching crossbar fabric 120.

Each line card 110 includes a set of input interfaces 111, a set of output interfaces 112, and a set of (i.e., plural) control elements 130.

Each control element 130 is disposed for receiving packets 113 at the input interfaces 111 and for transmitting those packets 113 to the switching fabric 120 for processing by the same or another control element 130.

Each control element 130 includes a receive element 140, a first memory controller 150, a first memory 160, a second memory controller 150, a second memory 160, a fabric interface element 170, a transmit element 180, and control circuits 190.

The receive element 140 includes circuits disposed for receiving a sequence of packets 113 from a set of associated input interfaces 111, and for sending those packets 113 to the first memory controller 150. In a preferred embodiment, the receive element 140 is also disposed for performing relatively simple processing functions on the packets 113, such as computing and checking consistency for packet headers or Internet Protocol (IP) header check-sum values.

The first memory controller 150 includes circuits disposed for the following functions:

receiving packets 113 from the receive element 140;

disassembling packets 113 into sequences of cells 151; and storing (and scheduling for storing) cells 151 in the first memory 160.

Although referred to herein as a single physical memory, the first memory 160 can include more than one SDRAM operating concurrently under the control of the first memory controller 150. In a preferred embodiment, the first memory 160 includes two physical memories, each of which can operate concurrently or in parallel; however, there is no particular requirement for using more than one physical memory for operation of the invention.

Similar to the first memory controller 150, the second memory controller 150 includes circuits disposed for the following functions:

retrieving (and scheduling for retrieving) cells 151 from the second memory 160;

reassembling packets 113 from sequences of cells 151; and sending packets 113 to the transmit element 180.

Similar to the first memory 160, although referred to herein as a single physical memory, the second memory 160 can include more than one SDRAM operating concurrently under the control of the second memory controller 150. In a preferred embodiment, the second memory 160 includes two physical memories, each of which can operate concurrently or in parallel; however, there is no particular requirement for using more than one physical memory for operation of the invention.

The fabric interface element 170 includes circuits disposed for sending packets 113 to the switching fabric 120, and disposed for receiving packets 113 from the switching fabric 120.

The transmit element 180 includes circuits disposed for sending packets 113 to output interfaces 112.

The control circuits 190 provide for control of the control element 130 in accordance with techniques described herein.

Memory Controllers

Figure 2:
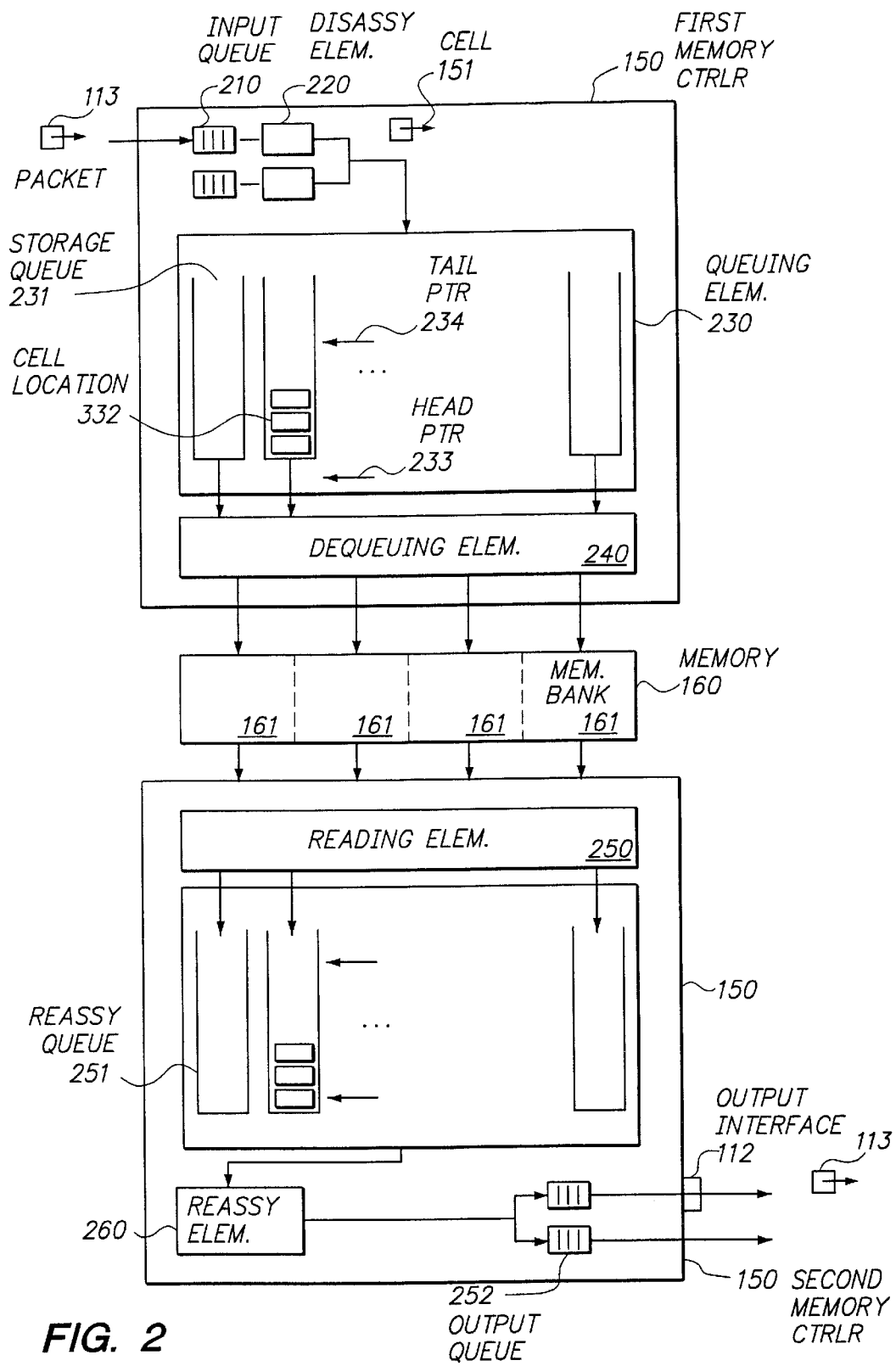
FIG. 2 shows a block diagram of the memory controllers in an improved system for packet buffer memory use.

FIG. 2 shows a block diagram of the memory controllers in an improved system for packet buffer memory use.

The first memory controller 150 and the second memory controller 150 have similar design; accordingly, the description below is made with reference to a single memory controller and a single memory. The single memory controller could be either the first memory controller 150 or the second memory controller 150, while the single memory could be either the first memory 160 or the second memory 160, as appropriate.

Write Controller

The memory controller 150 includes a set of input queues 210, each disposed for receiving and storing packets 113.

The memory controller 150 includes, for each input queue 210, a disassembly element 220 disposed for disassembling packets 113 into sequences of cells 151. In a preferred embodiment, each cell 151 is a uniform length (preferably 64 bytes). Thus, each packet 113 can consist of one or more cells 151.

The memory controller 150 includes a memory queuing element 230, disposed for queuing cells 151 for storage in the memory 160.

The memory 160 (or if there is more than one physical memory, each physical memory) includes a plurality of memory banks 161, each of which includes a segment of memory which is addressable by the memory 160 and separately usable by the memory 160.

For example, SDRAM memories having a plurality of memory banks are known in the art. One property of known memories having a plurality of banks is that the time during which the entire memory is busy (herein called "busy time") in storing an element in one bank is less than the time during which the individual bank is busy (herein called "latency time").

The memory queuing element 230 uses the difference between busy time and latency time for the memory 160 to access separate memory banks 161 of the memory 160. The memory queuing element 230 arranges the cells 151 so they can be stored into separate memory banks 161 in order, so that it can store cells 151 into separate memory banks 161 faster than if those cells 151 were stored into separate memory banks 161 at random.

The memory queuing element 230 includes a plurality of storage queues 231, one for each memory bank 161. Each storage queue 231 includes a set of cell locations 232, each of which holds a single cell 151, a storage queue head pointer 233, and a storage queue tail pointer 234.

In sequence, at a speed consistent with the busy time of the memory 160, the memory queuing element 230 commands memory banks 161 to store single cells 151 from the cell location 232 denoted by the storage queue head pointer 233.

Memory banks 161 are therefore used to store single cells 151 at a speed consistent with the busy time, rather than the latency time, of the memory 160. Where there are two or more physical memories, the memory queuing element 230 commands those two or more physical memories to operate concurrently or in parallel, so that storage bandwidth into each physical memory can be as fully utilized as possible.

The memory controller 150 includes a dequeuing element 240, disposed for dequeuing cells 151 from the storage queues 231 for storage in the memory 160.

The dequeuing element 240 stores one cell 151 in sequence from one cell location 232 at the head of each storage queue 231 into its designated location in the memory 160. The dequeuing element 240 updates for each storage queue 231, the storage queue head pointer 233 and the storage queue tail pointer 234.

In a preferred embodiment, the dequeuing element 240 stores the cells 151 in the memory 160 in the sequence in which they were entered into each storage queue 231 (that is, the dequeuing element 240 does not reorder cells 151 within any of the storage queues 231). In alternative embodiments, the dequeuing element 240 may reorder cells 151 within the storage queues 231 to achieve greater speed at writing to the memory 160.

Read Memory Controller

The memory controller 150 includes a memory reading element 250, disposed for reading cells 151 from the memory 160 for transmission.

The following description is similar to operation of the memory queuing element 230.

The memory reading element 250 may identify packets 113 that are to be sent to output interfaces in response to their location in the memory 160 (that is, in selected areas of the memory 160 designated for associated output interfaces).

The memory reading element 250 may read the cells 151 for those packets 113 in sequence from their locations in the memory 160 into a set of reassembly queues 251, similar to the storage queues 231. The memory reading element 250 may reassemble the packets 113 from the cells 151 located in the reassembly queues 251, similar to disassembly of the packets 113 into cells 151 for placement in the storage queues 231.

Once packets 113 are reassembled, they are sent to a set of output queues 252, each of which is associated with a selected output interface 112. From each selected output interface 112, packets 113 are sent to the associated fabric interface element 170 or transmit element 180.

Timing Diagram

Figure 4:
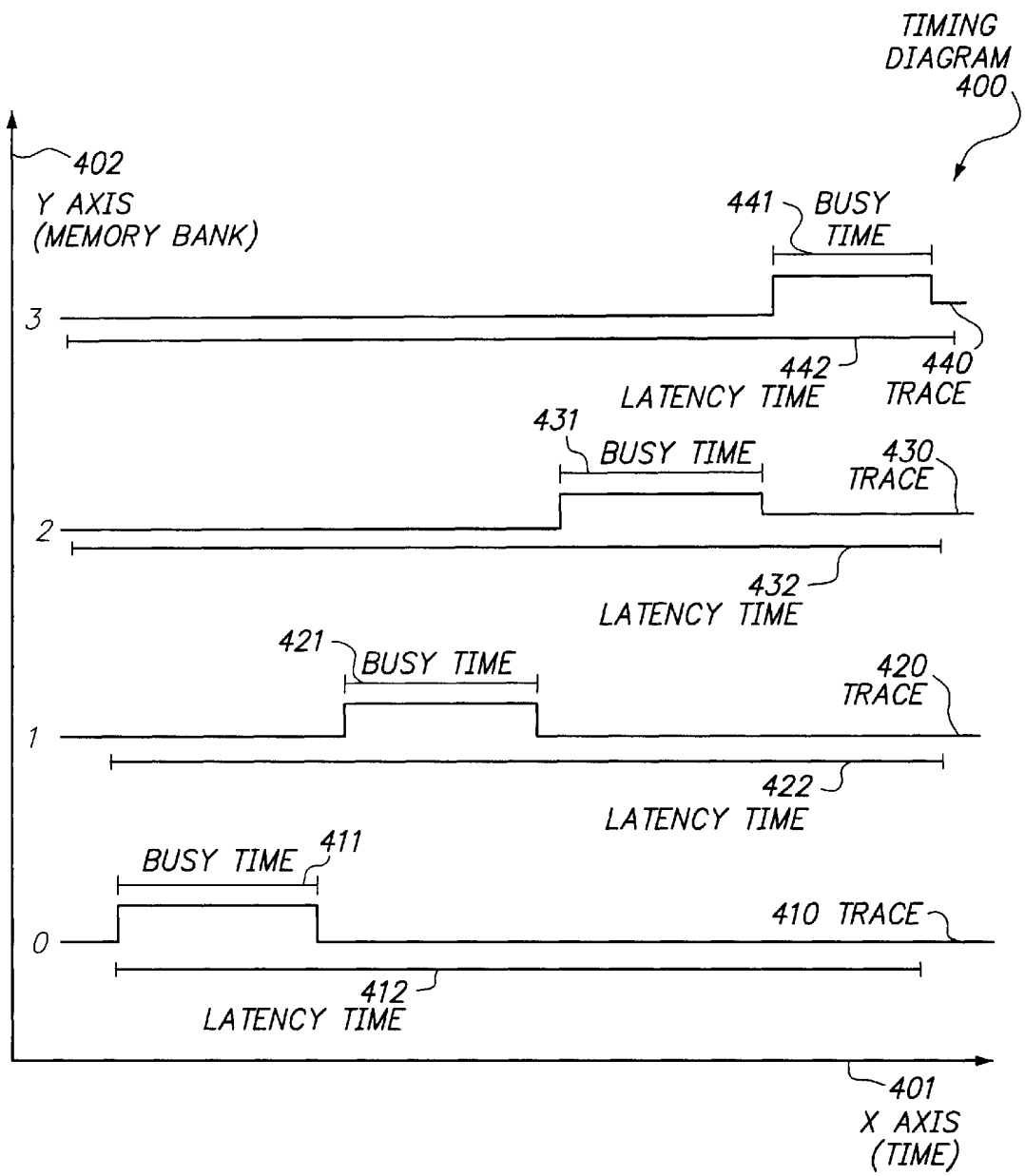
FIG. 4 shows a timing diagram that illustrates the timing of activities occurring in an improved system for packet buffer memory use.

FIG. 4 shows a timing diagram that illustrates the timing of activities occurring in an improved system for packet buffer memory use.

A timing diagram 400 includes an X axis 401 showing progressive time, and a Y axis 402 showing individual memory banks 161 in the memory 160.

A first trace 410 shows a busy time 411 during which the entire memory 160 is busy for writing to a first memory bank 161, and a latency time 412 during which the first memory bank 161 is busy but the rest of the memory 160 is not necessarily busy.

Similarly, a second trace 420 shows a similar busy time 421 and latency time 422 for writing to a second memory bank 161.

Similarly, a third trace 430 shows a similar busy time 431 and latency time 432 for writing to a third memory bank 161.

Similarly, a fourth trace 440 shows a similar busy time 441 and latency time 442 for writing to a fourth memory bank 161.

The timing diagram 400 shows that operation of the memory 160 proceeds at an effective rate equal to L/B times the ordinary storage speed of the memory 160, where L=latency time, and B=busy time.

Writing Stripes

The memory queuing element 230 arranges cells 151 in the storage queues 231 so that an entire set of cell locations 232, one for each memory bank 161 (herein called a "stripe") can be stored into the memory 160 concurrently.

The memory queuing element 230 arranges sequential cells 151 from packets 113 in sequential storage queues 231, so that when those sequential cells 151 are stored into the memory 160, they are stored into sequential locations therein. However, those sequential cells 151 are written into the memory 160 in stripe order, thus not necessarily in the order in which they arrived in packets 113.

Although sequential cells 151 are written into the memory 160 in stripe order, they are not necessarily written into the memory 160 in sequential locations in those memory 160. Thus, a single stripe can include cells 151 to be written into different areas of the memory 160, in particular in a preferred embodiment where those different areas of the memory 160 are associated with different packet queues.

Method of Operation

Figure 3:
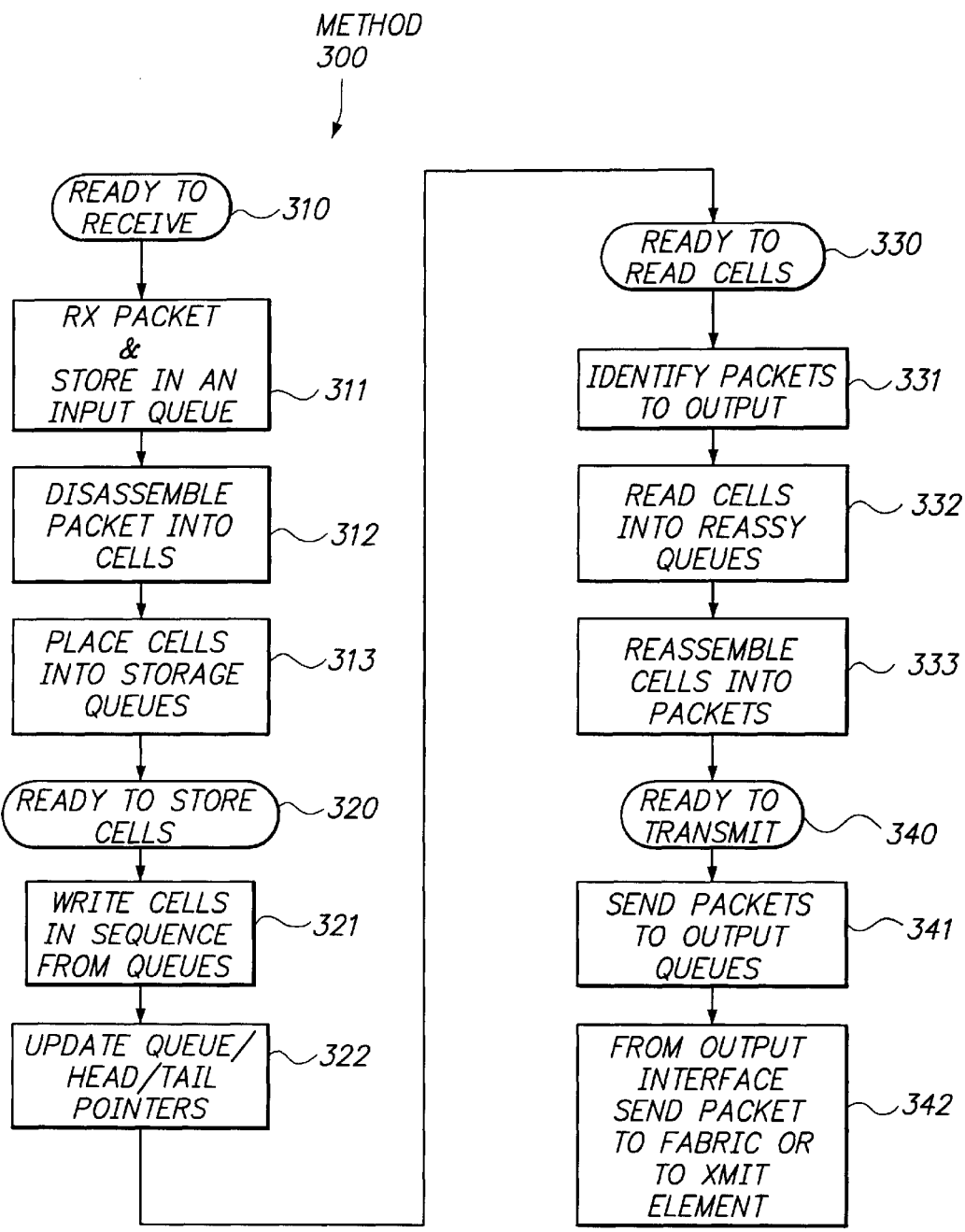
FIG. 3 shows a process flow diagram of a method for using an improved system for packet buffer memory use.

FIG. 3 shows a process flow diagram of a method for using an improved system for packet buffer memory use.

A method 300 is performed by the system 100, including the plural line cards 110, each having plural control elements 130, and switching (crossbar) fabric 120. Each control element 130 includes the receive element 140, the first memory controller 150, the first memory 160, the second memory controller 150, the second memory 160, the fabric interface element 170, the transmit element 180, and control circuits 190.

Receiving Packets

At a flow point 310, the system 100 is ready to receive a packet 113.

At a step 311, the receive element 140 receives the packet 113 and stores the packet 113 in an input queue 210.

At a step 312, the disassembly element 220 disassembles the packet 113 into one or more cells 151. Each cell 151 has a uniform length, preferably 64 bytes. If the packet 113 is not an exact multiple of the cell length, the last cell 151 in that packet 113 can contain undetermined data which had been stored in the cell 151 at an earlier time.

At a step 313, the memory queuing element 230 places the sequence of cells 151 for the packet 113 in a related sequence of storage queues 231. As each cell 151 is placed in its related storage queue 231, the memory queuing element 230 updates the tail pointer for that storage queue 231.

Storing Cells into Memory

At a flow point 320, the system 100 is ready to store cells 151 in the memory 160. The method 300 performs those steps following this flow point in parallel with those steps following other flow points.

At a step 321, the dequeuing element 240 writes cells 151 in sequence from the head of each storage queue 231 to its designated location in the memory 160.

At a step 322, the dequeuing element 240 updates, for each storage queue 231, the storage queue head pointer 233 and the storage queue tail pointer 234.

Reading Cells from Memory

At a flow point 330, the system 100 is ready to read cells 151 from the memory 160. The method 300 performs those steps following this flow point in parallel with those steps following other flow points.

The following description is similar to operation following the flow point 320.

At a step 331, the memory reading element 250 identifies, in response to their location in the memory 160, packets 113 that are to be sent to output interfaces 112.

At a step 332, the memory reading element 250 reads the cells 151 for those packets 113 in sequence from their locations in the memory 160 into the reassembly queues 251.

At a step 333, the memory reading element 250 reassembles packets 113 from those cells 151.

Transmitting Packets

At a flow point 340, the system 100 is ready to transmit packets 113. The method 300 performs those steps following this flow point in parallel with those steps following other flow points.

At a step 341, reassembled packets 113 are sent to a set of output queues 252, each of which is associated with a selected output interface 112.

At a step 342, from each selected output interface 112, packets 113 are sent to the associated fabric interface element 170 (for the first memory controller 150) or to the transmit element 180 (for the second memory controller 150).

Generality of the Invention

The invention has substantial generality of application to various fields in which data is reordered for writing into or reading from a storage device. These various fields include, one or more of, or a combination of, any of the following (or any related fields):

Routing packets, frames or cells in a datagram routing network, in a virtual circuit network, or in another type of network. This application could include packet routing systems, frame relay systems, aynchronous transfer mode (ATM) systems, satellite uplink and downlink systems, voice and data systems, and related systems.

Queueing packets, frames or cells in a scheme in which different queues correspond to differing quality of service or allocation of bandwidth for transmission. This application could include broadcast, narrowcast, multicast, simulcast, or other systems in which information is sent to multiple recipients concurrently.

Operating in parallel using multiple memory banks or related storage devices, or using memory banks or related storage devices that have the capability to perform true parallel operation.

Reordering data for processing by multiple components, including either hardware processor components or software components. This application could include reordering of data that is not necessarily fixed length, such as the cells used in the preferred embodiment.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method including steps for
   receiving data units for writing to a memory, said data units being received in a first sequence;
   storing said data units in a set of storage queues, wherein storing includes advancing a number of said data units out of said first sequence; and
   writing data units from said set of storage queues to a plurality of regions of said memory, in an order other than the order of said first sequence.

2. A method as in claim 1, wherein writing said data units in an order other than the order of said first sequence enables concurrent access to a plurality of independent memory banks comprising said memory.

3. A method as in claim 1, wherein the size of said data units is uniform.

4. A method as in claim 1, wherein
   said memory has a busy time for each of said regions;
   said memory has a latency time for each of said regions, said latency time being greater than said busy time for each region;
   whereby the writing of data units occurs with less latency than writing said data units in said first sequence.

5. A method as in claim 1, wherein said plurality of regions are located in memory elements capable of operating in parallel.

6. A method as in claim 1, wherein said step for storing is performed in an order of said first sequence.

7. A method as in claim 1, wherein the writing of data units occurs in an order that is optimal for writing said data units into said memory with respect to at least one of the following parameters: (1) latency and (2) speed.

8. A method as in claim 1, further including steps for
   reading data units from said memory in a sequence;
   storing said sequence of data units in a set of reassembly queues; and
   reordering said data units as they are output from said reassembly queues to a set of output queues.

9. A method as in claim 1, wherein said plurality of regions are located in a plurality of independent memory banks comprising said memory.

10. A method as in claim 9, wherein said plurality of independent memory banks operate concurrently.

11. A method as in claim 1, wherein said first sequence of data units comprises a sequence in which said data units are present in a packet, said method further including steps for
    receiving said packet; and
    disassembling said packet into said data units.

12. A method as in claim 11, further including steps for
    reading data units from said memory; and
    reassembling said packet from said data units read from said memory.

13. A memory controller apparatus coupled to a memory, said apparatus including
    an input queue capable of receiving data units in a first sequence;
    a set of storage queues coupled to said input queue and receiving said data units from said input queue such that adjacent data units in said sequence are stored in differing storage queues, wherein a number of said data units are advanced out of said first sequence; and
    dequeuing element coupled to said storage queues, wherein said dequeuing element controls the writing of said data units from said storage queues to said memory in an order other than said first sequence.

14. Apparatus as in claim 13, wherein the size of said data units is uniform.

15. Apparatus as in claim 13, wherein said dequeuing element is disposed for reordering said data units stored in said storage queues so as to maintain busy a plurality of memory banks that operate independently in said memory.

16. Apparatus as in claim 13, wherein said dequeuing element operates to write said data units in an order that is optimal for writing into said memory with respect to at least of one of the following parameters: (1) latency and (2) speed.

17. Apparatus as in claim 13, wherein
    said memory has a busy time for each of said regions;
    said memory has a latency time for each of said regions, said latency time being greater than said busy time for each said region; and
    said dequeuing element operates to write to said memory with less latency than writing said data units in said first sequence.

18. Apparatus as in claim 13, wherein said memory includes a plurality of memory elements capable of operating in parallel.

19. Apparatus as in claim 13, wherein said first sequence of data units comprises a sequence in which said data units are present in a packet, and wherein said apparatus further includes a disassembly element capable of generating one or more of said data units from said packet.

20. Apparatus as in claim 19, wherein said memory controller is disposed for reading said data units from said memory; and reassembling said packet from said data units read from said memory.

21. Apparatus as in claim 13, wherein said memory includes a plurality of independent memory banks.

22. Apparatus as in claim 21, wherein a plurality of said memory banks operate concurrently.

23. A method of rapidly storing packets in a memory of a packet-switching router, comprising the computer-implemented steps of:

receiving a plurality of packets in a set of input queues for writing to a memory;

disassembling said packets into data units in a first sequence;

storing said data units in a set of storage queues, wherein said step of storing includes advancing a number of said data units out of said first sequence;

dequeuing said data units from storage queues; and writing said data units from said set of storage queues to a plurality of regions of said memory in an order other than the order of said first sequence.

24. A method as recited in claim 23, further comprising the steps of:

reading data units from said memory in a sequence;

storing said sequence of data units in a set of reassembly queues; and reordering said data units as they are output from said reassembly queues to a set of output queues.

25. A memory controller apparatus coupled to a memory, said apparatus including a set of input queues capable of receiving packets;

a disassembly element coupled to said set of input queues, said disassembly element disassembling said packets into data units in a first sequence;

a set of storage queues coupled to said disassembly element and receiving said data units from said disassembly element such that adjacent data units in said first sequence are stored in differing storage queues, wherein a number of data units are advanced out of said first sequence; and a dequeuing element coupled to said storage queues, wherein said dequeuing element controls the writing of said data units from said storage queues to said memory in an order other than said first sequence, said dequeuing element further dequeuing said data units from said storage queues.

26. Apparatus as in claim 25, wherein said apparatus further includes a reading element capable of reading data units from a memory in a first sequence;

a set of reassembly queues coupled to said reading element and capable of storing said data units; and a reassembly element coupled to said reassembly queues, said reassembly element reordering and outputting said data units to a set of output queues.

* * * * *

UNITED STATES PATENT AND TRADEMARK OFFICE
CERTIFICATE OF CORRECTION

PATENT NO.   : 6,757,791 B1
DATED        : June 29, 2004
INVENTOR(S)  : Robert O' Grady et al.

It is certified that error appears in the above-identified patent and that said Letters Patent is hereby corrected as shown below:

Title page,
Item [56], References Cited,
Please add -- U.S. PATENT DOCUMENT    Name of Patentee    Date of Publication
              5,228,062                Bingham             07-13-1993 --

Column 8,
Line 39, "dequeuing element" should read -- a dequeuing element --.

Signed and Sealed this

Thirty-first Day of August, 2004

JON W. DUDAS
*Director of the United States Patent and Trademark Office*